United States Patent [19]
Petit

[11] Patent Number: 5,739,510
[45] Date of Patent: Apr. 14, 1998

[54] CARD READER TERMINAL AND METHOD FOR THE MULTI-APPLICATIVE OPERATION OF SUCH A TERMINAL

[75] Inventor: Stéphane Petit, Courseulles, France

[73] Assignees: France Telecom, Paris; La Poste, Boulogne Billancourt, both of France

[21] Appl. No.: 589,300

[22] Filed: Jan. 22, 1996

[30] Foreign Application Priority Data

Jan. 23, 1995 [FR] France .................. 95 00722

[51] Int. Cl.$^6$ .............. G06K 5/00; G06K 19/06
[52] U.S. Cl. ............ 235/380; 235/492; 235/384
[58] Field of Search ................ 235/452, 380, 235/384, 382, 385, 494; 395/900; 364/237, 266; 379/456, 40

[56] References Cited

U.S. PATENT DOCUMENTS

| | | | |
|---|---|---|---|
| 4,764,666 | 8/1988 | Bergeron | 235/380 |
| 4,839,504 | 6/1989 | Nakano | 235/379 |
| 5,070,233 | 12/1991 | Takizawa et al. | 235/380 |
| 5,247,164 | 9/1993 | Takahashi | 235/380 X |
| 5,485,628 | 1/1996 | Clements | 395/300 |

FOREIGN PATENT DOCUMENTS

| | | |
|---|---|---|
| 0171035 | 2/1986 | European Pat. Off. . |
| 004313595A1 | 11/1993 | Germany ............ 235/494 |
| 92/10806 | 6/1992 | WIPO . |

Primary Examiner—Donald T. Hajec
Assistant Examiner—Thien Minh Le
Attorney, Agent, or Firm—Pearne, Gordon, McCoy & Granger LLP

[57] ABSTRACT

The invention relates to a method for them multi-applicative operation of a card reader terminal (10), in which there is a link (11) with at least one electronic card (12), which may or may not have a memory and which is dedicated to the performance of an application. The card performs applicative operations and dialogues with the terminal (10) for making available inputs-outputs and capabilities of the terminal. The terminal becomes a slave, at the applicative level, with respect to said electronic card (12) in which the application is performed. The invention also relates to a card reader terminal.

5 Claims, 2 Drawing Sheets

CARD READER TERMINAL AND METHOD FOR THE MULTI-APPLICATIVE OPERATION OF SUCH A TERMINAL

DESCRIPTION

TECHNICAL FIELD

The present invention relates to a card reader terminal and to a method for the multi-applicative operation of such a terminal.

PRIOR ART

Card reader terminals, which may or may not be connected to a remote information processing centre, which can be fixed or mobile, portable or non-portable, must accept ever more varying memory cards and consequently perform ever more varied applications.

Therefore the card reader terminal designer must either provide a large number of applications on his card reader terminal with the risk that each user only uses a small part thereof, or must install therein application processing capacity extension systems, which increases the cost thereof. For security reasons, the card reader terminal designer must also provide mechanisms permitting a partitioning of the applications present on the card reader terminal, which also increases the cost of the latter.

In order to permit the massive distribution and use of a card reader terminal, a card reader terminal designer must make available to his customer low cost equipment permitting access to a large number of applications, which is in contradiction with the preceding paragraph.

The different technical solutions which can be provided for the multi-applicative operation of a card reader terminal will now be described.

Standard Application Operation Diagram

The automation of the card reader terminal associated with the performance of an application is strictly the same no matter what the application. The applications suppliers base the scenarios of their applications on said automaton. This system is not very flexible.

Remote Application Teleloading

The card reader terminal has a memory, which is teleloaded at a remote information processing centre. This solution imposes the possession of a card reader terminal, which can be connected to a remote information processing centre and which has adequate storage capacities for receiving new applications. As its capacity is limited, new problems arise concerning the control of applications present on the card reader terminal, namely version control, teleloading prior to the use of a specific application, etc.

Additive Memory on the Card Telephone

It is possible to envisage the provision on the card reader terminal of a location for receiving a memory extension card. In order to use his service, the application supplier distributes extension cards which are inserted in the card reader terminal during the application use in question. The use of such cards does not prevent the use of a memory card dedicated to the service during the performance of the application. It is pointed out that with such a solution, the cost of putting into place a service is high. In addition, the fragility of the connectors does not permit a systematic exchange of extension cards to give access to different services. It is then necessary to envisage the grouping of information providers for the design and distribution of extension cards.

Application Change in Micro Language Contained in the Application Card

The application card contains the application program used. This program is in the form of computer language of the card reader terminal. It is loaded into the card reader terminal prior to the use of the application. This solution requires the making available in a sufficient quantity random access or other memory programs on the card reader terminal for loading the program of the application contained in the memory card. The applicative program loading time is dependent thereon. It is also difficult to envisage the forcing of all industrial organizations to give their card reader terminals microprocessors of the same family or which are compatible.

Loading of Interpreted Programs Contained in the Application Card

The operating principle is similar to the preceding solution. However, the loaded program of the memory card to the card reader terminal is written in interpreted language. To perform an application, it is necessary to define an interpreted language grouping the processing functions and standard input-output functions associated with the card reader terminal. The disadvantages concerning the making available by the random access memory card reader terminal and the slowness of loading programs from the memory card still exist.

Existing Exemplified Embodiment

The problem of the extendability of the card reader terminal has been dealt with on a France Telecom equipment called the "Lecam" (memory card reader), which has three separate solutions for ensuring extendability.

Thus, it can be teleloaded via the Teletel network by the applicative server with applicative programs which are performed following the reception of express server orders. It is pointed out that only "Lecams" equipped with safeguarded memory or left live retain the teleloaded programs.

It can be teleloaded with a program contained in a card following the introduction of the latter, the performance of the program being controlled either by the applicative server, or after inserting a memory card.

It can be modified by read only memory change, the program being controlled either on rendering live, or after inserting a memory card.

In all the above-considered cases the programs are written in interpreted language.

The invention is directed at a simple performance solution, which permits on the basis of standard card reader terminals to perform any type of application, no matter whether they are applications using one or more memory cards or not.

DESCRIPTION OF THE INVENTION

Therefore the present invention proposes a method for the multi-applicative operation of a card reader terminal, characterized in that a connection is made with at least one electronic card, which may or may not have a memory and which is dedicated to the performance of an application, said card performing applicative operations and dialoguing with the terminal for the making available of inputs-outputs and capabilities of the terminal, the terminal becoming a slave, at the applicative level, with respect to the electronic card in which the application is performed.

The terminal presents to the electronic card an applicative interrogation order and then recovers an applicative order to be performed. The terminal interprets the applicative orders, performs the operations allocated thereto and acknowledges them. In the case where the applicative order requires an applicative response, the terminal presents to the electronic card an entering order comprising the applicative response serving as the interrogation applicative order for the next applicative action to be performed. In the opposite case, the terminal is still the requester of an applicative action to be performed with the aid of an applicative interrogation order. This solution solves by definition the problem of the partitioning of applications.

The field of application of such a method is vast, because it is possible to use it for card reader terminals which may or may not be connected to a remote information processing centre, in fixed or mobile form, or portable or non-portable.

The invention also relates to a card reader terminal with or without a memory having in particular a central processing unit connected to several peripheral assemblies such as a card file, a keypad, a modem, a DTMF transmitter, a display or a card reader, in conjunction with at least one electronic card, which may or may not have a memory and dedicated to the performance of an application.

DETAILED DESCRIPTION OF EMBODIMENTS

Figure 1:
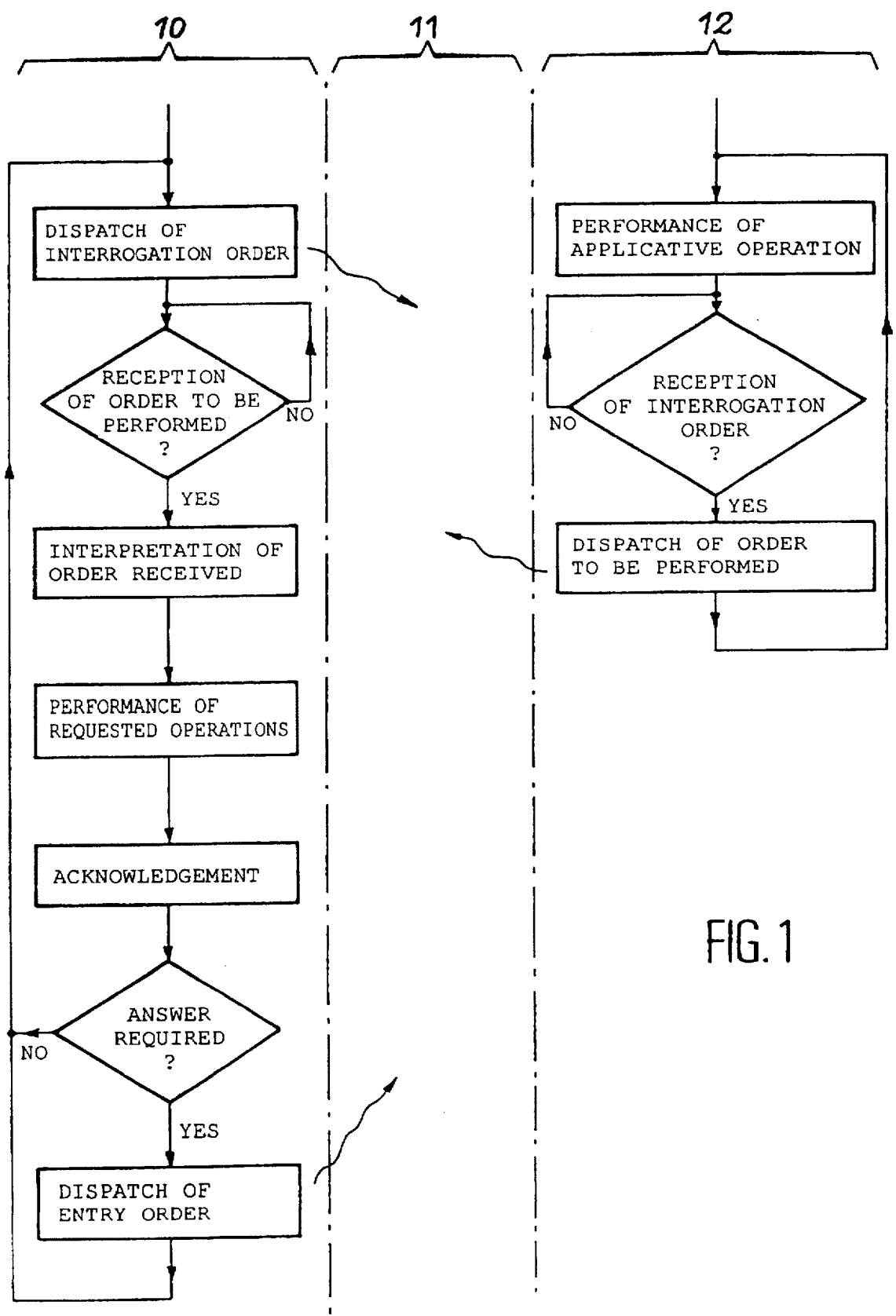
FIG. 1 illustrates an exchange session according to the method of the invention.

The method according to the invention, illustrated in FIG. 1, serves for the multi-applicative operation of a card reader terminal 10 in conjunction 11 with at least one electronic card, e.g. a memory card incorporating a microprocessor 12, in which is implemented a program linked with an application. It is optionally possible to separate the support of the application, which is the memory card, from the data support necessary for performing the application, which can be another card with or without a memory (e.g. a magnetic track card).

Figure 2:
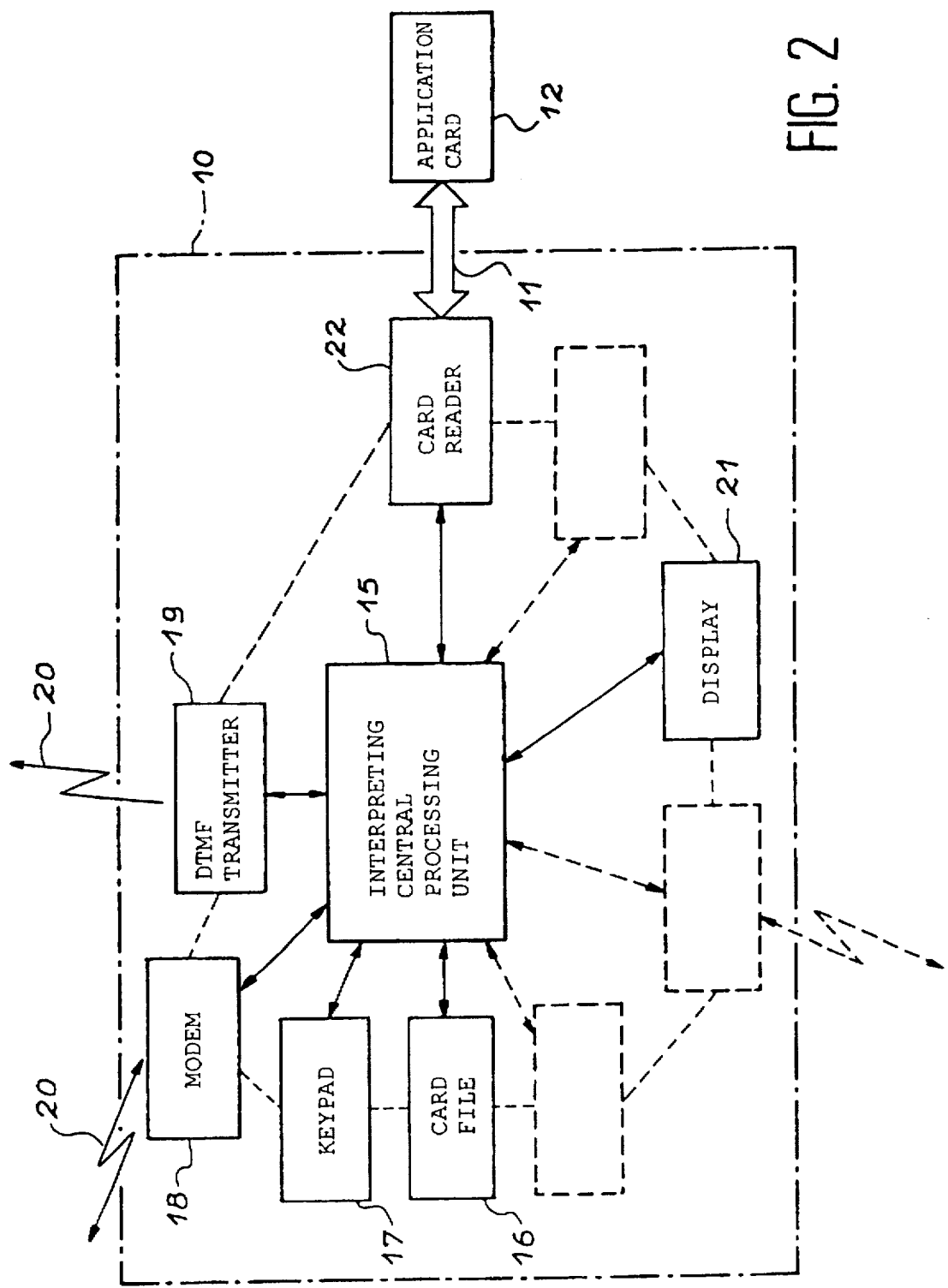
FIG. 2 shows a card reader terminal according to the invention.

FIG. 2 illustrates a card reader terminal 10 according to the invention in conjunction 11 with an application card 12. This terminal 10 comprises an interpreting central processing unit 15 linked with several peripherals such as a card file 16, keypad 17, modem 18 and DTMF transmitter 19 permitting connections 20 with the outside, a display 21, a card reader 22, etc.

The card 12 performs applicative operations and dialogues with the card reader terminal 10 for the making available of inputs-outputs and capabilities of the terminal. The card reader terminal 10 no longer has to make the random access memory available to the application. The teleloading phase no longer exists. The implementation requires the definition of the input-output orders and the standardization of these orders between card reader terminal manufacturers. An information provider wishing to design an application, which may or may not require security, can produce and distribute a card associated with his services.

In such a solution, illustrated in FIG. 1, the card reader terminal 10 becomes a slave, at the applicative level, with respect to the card 12 in which the application takes place and the dialogue between the card reader terminal 10 and the card 12 remains compatible with standard 7816-3.

On resetting, the card type 12 is determined by the card reader terminal 10. If the card 12 is of the application type, the card reader terminal 10 presents to the card 12, with the aid of an ISO entering order 7816-3, an applicative interrogation order and then recovers with the aid of two exiting orders ISO 7816-3 an applicative order to be performed. The applicative orders are in format T (type), L (length) and V (value). The first exiting order extracts the data T and L and the second extracts the data V.

The mechanism for extracting the application of card 12 is consequently operated. The card reader terminal 10 interprets the applicative orders, performs the operations allocated thereto and acknowledges them. In the case where the applicative order requires an applicative response, the card reader terminal 10 presents to the card 12 an entering order including the applicative response at format TLV. This response serves as an applicative interrogation order for the following applicative action to be performed. In the opposite case, the card reader terminal 10 is still requesting an applicative action to be performed with the aid of an applicative interrogation order.

This exchange session according to the invention will now be described. The three orders 7816-3 necessary for performing the above operations are:

Applicative writing: This order enables the card reader terminal 10 to present to the card 12 acknowledgements or applicative interrogation requests.

Applicative reading TL: This order permits the reading of the type and length of the applicative order to be performed and it is necessarily followed by the applicative reading order V.

Applicative reading V: This order completes the preceding order and makes it possible to receive data associated with the previously received type and length.

The values of the applicative writing, applicative reading TL and applicative reading V orders are to be standardized between card reader terminal designers and manufacturers.

The orders and applicative acknowledgements are linked with the exploitation of the input-output resources of the card reader terminal 10 and are in format TLV (type, length, value) and can have contents which should be defined between card reader terminal manufacturers.

One application is a concatenation of applicative entering and exiting orders. It always starts in the same way with the aid of an applicative interrogation order and it terminates with an unacknowledged application finish order.

The field of application of such a concatenation of orders is vast, because it can be used for card reader terminals, which may or may not be connected to a remote data processing centre, fixed or mobile, portable or non-portable.

To illustrate this, an analysis will be made of the case of a card reader telephone accessing a voice betting centre. This has been deliberately simplified in order to be able to reduce the functionalities of the card reader telephone and the memory card associated with the service.

The dialogue for guiding the user takes place vocally and with the aid of the keys of the keypad of his card reader telephone, he can bring informations to the voice server in DTMF form (Dual Tone Multifrequency). The card reader telephone can transmit informations from the memory card in various formats. The card reader telephone must be synchronized with the voice application taking place on the voice server.

DESCRIPTION OF THE SERVICE

A service provider working in the betting field offers his faithful customers, who have a credit line with him, the possibility of betting with the aid of a card reader telephone, based on DTMF operation, with respect to a voice server. In order to reliably allocate the winnings, he has a need to identify his customers. The customers must also have proof of their commitment and their bet. The service provider decides to supply them with a memory card enabling them to make their bets with the previously described conditions.

In order to be able to perform these operations, the memory card must be coupled to a card reader telephone. It is possible for the service provider to supply with the memory card a card reader telephone dedicated to the betting service or to use a standard card reader telephone utilizing the aforementioned system.

IMPLEMENTATION
Performing the Operation

It is assumed that the call to the betting centre takes place automatically. The user lifts the receiver and introduces his memory card dedicated to the service into the card reader telephone, which reads the type of application of the memory card and then, if appropriate, starts up the process of extracting the application from the memory card. With the aid of the proposed system, the memory card controls the card reader telephone in order to dial the telephone number and then transmit the data from the memory card necessary for the transaction taking place, in order to perform certain displays on the screen of the card reader telephone if this is provided, for carrying out the necessary acquisitions for the security calculation necessary for the transaction taking place, etc.

The Card Reader Telephone

The card reader telephone is provided with the application extraction system and is able to perform a group of applicative orders defined e.g. as dialling, transmitting a DTMF character, displaying a message on the screen, entry with the keypad with or without echo, scrambled or not, etc.

The Memory Card Associated with the Service

The memory card dedicated to the application contains, apart from the identification data and the secrets, the automation of the application which takes place in synchronized manner with the associated voice server (in fact it controls the local server beyond the card reader telephone) and accepts the extraction of this automation by the aforementioned system.

TLV Instructions Necessary for Such a Session

In the present case it is considered that the card reader telephone is not screen-equipped. The list of possible orders given below is of an exemplified nature:

dialling (telephone number)

DTMF transmission (DTMF numbers)

acknowledgement (acknowledge state)

entry request (scrambled or not, number of characters before confirmation [#]

entry (characters)

session end.

Performance of the Session

| Voice server | Card reader telephone | Applicative memory card |
|---|---|---|

The user lifts the receiver and introduces his memory card into the telephone reader.

| | | |
|---|---|---|
| | | Card-type reading |
| | Type of card | If the card is of the applicative type |
| | | Applicative reading TL |
| | TL (dial [telephone number]) | |
| Applicative reading V | | |
| | V (dial [telephone number]) | |

The card reader telephone dials and accesses the voice server.

| | | |
|---|---|---|
| | | Applicative writing TLV (acknowledgement [state]) |
| | | Applicative reading TL |
| | TL (request entry [scrambled, 4]) | |
| Applicative reading V | | |
| | V (request entry [scrambled, 4]) | |

The voice server welcomes the customer.
It asks him to enter his confidential code.

| | | |
|---|---|---|
| | | Applicative writing TLV (entry [entry result]) |
| | | The memory card checks the confidential code and continuation takes place if it is correct |
| Applicative reading TL | | |
| | TL (DTMF transmission [correct confidential code]) | |
| Applicative reading V | | |
| | V (DTMF transmission [correct confidential code]) | |

The voice server receives the card for accepting the confidential code and it continues its application.

| | | |
|---|---|---|
| | | Applicative writing TLV (acknowledgement [state]) |
| | | Applicative reading TL |
| | TL (request entry [uncoded, 4]) | |

The voice serves requests the entry of the bet number.
The user types on the keypad of his card reader telephone.
The sound of the keys returns as echo to the voice server.

| | | |
|---|---|---|
| | | Applicative writing TLV (entry [entry result]) |
| | | The memory card stores this result |
| | | Applicative reading TL |
| | TL (request entry [uncoded, 4]) | |
| | | Applicative reading V |
| | V (entry request [uncoded, 4]) | |

The voice server requests the entry of the number on which the betting person is betting. The user types on his card reader telephone keypad.
The sound of the keys returns in echo form to the voice server.

| | | |
|---|---|---|
| | | Applicative writing TLV (entry [entry result]) |
| | | The memory card stores this result |
| | | Applicative reading TL |
| | TL (entry request [uncoded, 6]) | |
| | | Applicative reading V |
| | V (entry request [uncoded, 6]) | |

The voice server requests the entry of the amount of the bet.

The user types on the card reader telephone keypad.
The sound of the keys returns in echo form to the voice server.

| | |
|---|---|
| Applicative writing TLV (entry [entry result]) | |
| | The memory card stores this result and calculates a certificate on these three elements. |
| Applicative reading TL | |
| | TL (DTMF transmission [certificate, subscriber number]) |
| Applicative reading V | |
| | V (DTMF transmission [certificate, subscriber number]) |

The voice receiver receives the certificate and the subscriber number in the card. The client is thanked and the transaction completed.

| | |
|---|---|
| Applicative writing TLV (acknowledgement [state]) | |
| Applicative reading TL | |
| | TL (session end) |
| Applicative reading V | |
| | V (session end) |

The card reader telephone awaits the extraction of the memory card in order to start a new operation.

I claim:

1. Method for the multi-applicative operation of a card reader terminal (10), characterized in that a connection (11) is made between the terminal and at least one electronic card (12), which card may or may not have a memory and which is dedicated to the performance of an application, said card performing applicative operations and dialoging with the terminal (10) for making available inputs-outputs and capabilities of the terminal, the terminal becoming a slave at the applicative level with respect to the electronic card (12) in which the application is performed wherein the terminal (10) presents to the electronic card (12) an applicative interrogation order and then recovers an applicative order to be performed, and the terminal (10) interprets the applicative orders, performs the operations allocated thereto and acknowledges them.

2. Method according to claim 1, characterized in that in the case where the applicative order requires an applicative response, the terminal (10) presents to the electronic card (12) an entering applicative order including the applicative response serving as the applicative interrogation order for the next applicative action to be performed.

3. Method according to claim 1, characterized in that the case where the applicative order requires no applicative response, the terminal (10) is still requesting an applicative action to be performed with the aid of an applicative interrogation order.

4. Method according to any one of the preceding claims, characterized in that the applicative orders are at format T (type), L (length) and V (value).

5. Method according to claim 1, characterized in that the electronic cards (12) are memory cards, each incorporating at least one microprocessor.

* * * * *

UNITED STATES PATENT AND TRADEMARK OFFICE
CERTIFICATE OF CORRECTION

PATENT NO. : 5,739,510
DATED      : April 14, 1998
INVENTOR(S) : Stephane Petit

It is certified that error appears in the above-indentified patent and that said Letters Patent is hereby corrected as shown below:

```
Column 1, line 38, delete "automation" and insert
     --automaton--.

Column 5, lines 36-37, delete "automation" and insert
     --automaton--.

Column 5, line 41, delete "automation" and insert
     --automaton--.

Column 6, line 39, after "TL (request entry [uncoded, 4])"
     insert as follows:
        --Applicative reading V
                      V (request entry [uncoded, 4])--.

Column 8, line 7, delete "performed" and insert
     --performed,--.
```

Signed and Sealed this

FourthDay of August, 1998

*Attest:*

BRUCE LEHMAN

*Attesting Officer*    *Commissioner of Patents and Trademarks*